United States Patent [19]

Blatrix

[11] Patent Number: 4,489,926
[45] Date of Patent: Dec. 25, 1984

[54] WORKPIECE SUPPORTING AND CLAMPING UNIVERSAL DEVICE

[75] Inventor: Jean-Pierre Blatrix, Colombes, France

[73] Assignee: Automatique Industrielle S.A., France

[21] Appl. No.: 415,972

[22] Filed: Sep. 8, 1982

[30] Foreign Application Priority Data

Sep. 14, 1981 [FR] France ................. 81 17334

[51] Int. Cl.³ .............................. B23Q 3/02
[52] U.S. Cl. .................... 269/93; 269/238; 269/259 CS; 269/309; 269/235
[58] Field of Search ............ 279/6, 1 L, 1 J; 269/235, 900, 309, 310, 303–305, 91–94, 237–239, 254 CS

[56] References Cited

U.S. PATENT DOCUMENTS 2,456,776 12/1948 Faust ....................... 279/6
2,921,785 1/1960 Underhill .
3,227,438 1/1966 Sequin .................... 269/94
3,240,485 3/1966 Oser .
3,357,711 12/1967 Fischer ...................... 279/6

FOREIGN PATENT DOCUMENTS 393965 4/1924 Fed. Rep. of Germany .
852162 10/1952 Fed. Rep. of Germany ...... 279/1 L
2739109 5/1978 Fed. Rep. of Germany .
520778 6/1921 France .
7826581 4/1979 France .

Primary Examiner—Robert C. Watson
Attorney, Agent, or Firm—Steinberg & Raskin

[57] ABSTRACT

The workpiece supporting and clamping universal device of the invention comprises essentially an outer ring which can be secured to a base plate and into which are inserted a plurality of discs arranged concentrically in one another except for a disc which is eccentric with respect to the others, the discs being each provided with a column so that the columns are thus apt to cover all the points of any given surface by means of relative rotation of the discs.

8 Claims, 3 Drawing Figures

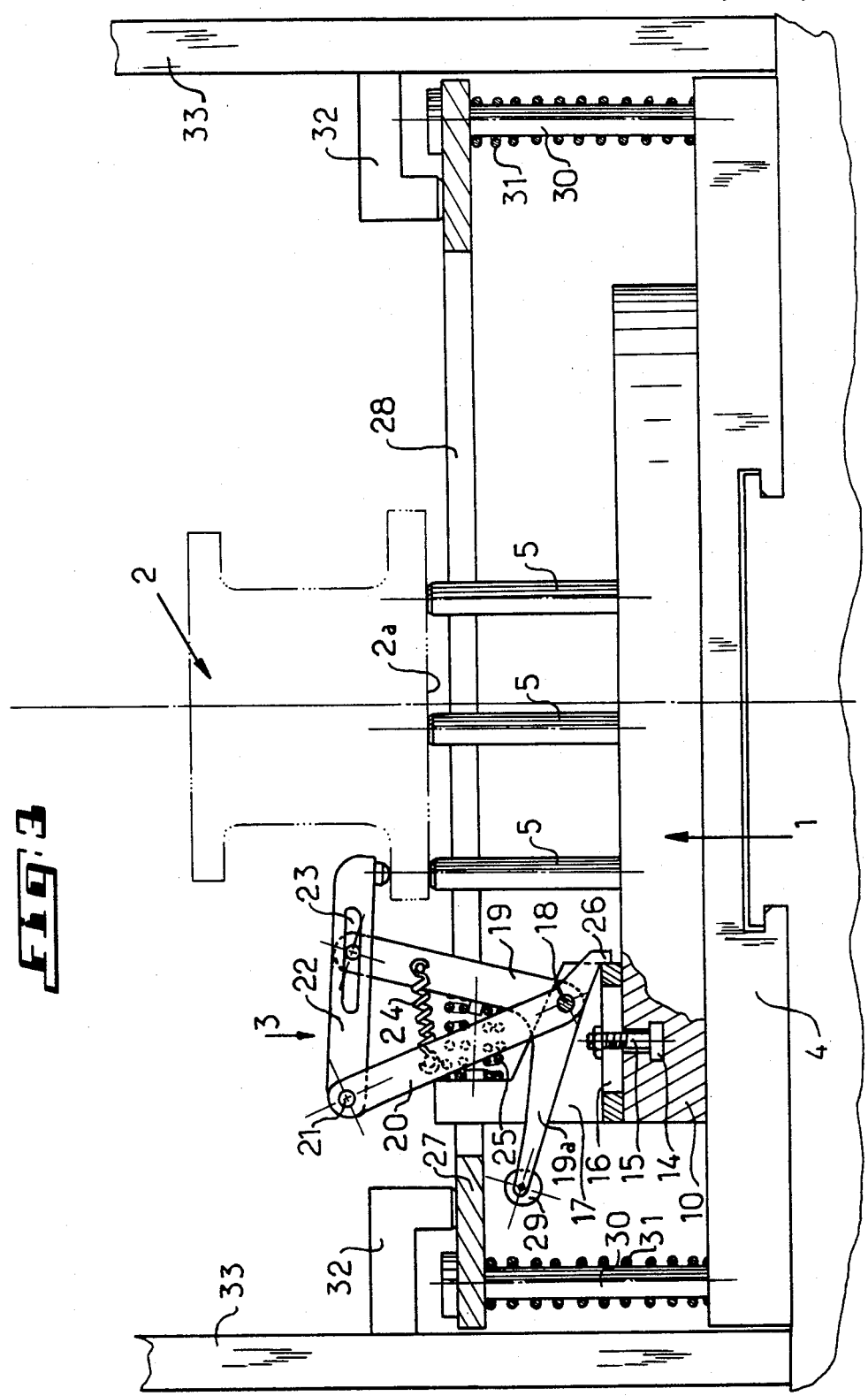

WORKPIECE SUPPORTING AND CLAMPING UNIVERSAL DEVICE

BACKGROUND OF THE INVENTION

The present invention has essentially for a subject matter a universal device for supporting and clamping a workpiece of any type, e.g. for subjecting it to machining operations.

There have already been proposed means for temporary supporting and holding of workpieces. Such known means are generally constituted by a base plate machined in most cases according to specific requirements and on which are mounted bearing columns for fixing the workpiece in height and in the horizontal plane, and by systems for holding the workpiece on the columns, such systems being actuated by appropriate mechanical, pneumatic, hydraulic or like means.

However, the above-mentioned means were specific to a definite workpiece and could not be adapted for a workpiece of a different shape, which, as is readily understood, was a considerable drawback from the viewpoint of costs and labour in works and workshops where series of workpieces having different shapes and dimensions have to be worked and machined. Indeed, it was hitherto necessary to adapt every time a supporting and holding means for the new workpiece to be machined, thus resulting in additional work.

SUMMARY OF THE INVENTION

It is therefore the purpose of the present invention to remedy in particular the above drawbacks by providing a new supporting and clamping device immediately adaptable to a workpiece of any shape and which can advantageously be used for example in a flexible workshop where prototypes or products in small series are manufactured and which are designed to allow workpieces of various shapes to be machined on a standard pallet or base plate.

To this end, the invention provides a universal device for temporary supporting and clamping of a workpiece of any shape, e.g. for subjecting it to machining operations, and of the type comprising a base plate on which are mounted workpiece supporting columns or the like and means for clamping and unclamping said workpiece, characterized in that the said columns are rigidly connected with respective discs preferably insertable into one another and which are relatively movable in rotation on the said base plate so that the said columns can cover all the points of any given surface and thus form a supporting plane adaptable to any workpiece shape.

Thus, whatever the shape of the workpiece surface to be machined, one can be always sure that the workpiece will be correctly supported by and clamped with the supporting and clamping universal device according to the present invention.

According to another characterizing feature of this device, the aforesaid discs are arranged concentrically in one another, except for at least one of them which is eccentric with respect to the others.

According to another characterizing feature, the said eccentric disc is provided with at least one column passing through the common centre of rotation of the other discs.

According to a preferred form of embodiment, the said eccentric disc rotates in a first disc having no column.

About this first disc are arranged concentrically and successively a second disc and a third disc each carrying at least one column.

According to another characterizing feature of the invention, all the aforesaid discs are inserted into an outer ring concentric with the aforesaid third disc and rigidly connected to the base plate.

According to another characterizing feature of the device, the mutually contacting surfaces of the discs and the outer ring are conical.

Thus, owing to their conicity, the discs are correctly applied to the base plate, thus ensuring excellent accuracy, and no difficulty will arise when completely disassembling the set of discs, the conicity of which obviates any jamming.

Also according to the invention, each disc is provided with a radial slit allowing it to be extensible and rigidly connectable to the base plate by means of a conical screw of other like means introduced into the said slit.

According to still another characterizing feature of the invention, the aforesaid outer ring is provided with a circular slot in which are secured adjustably around the workpiece the aforesaid clamping and unclamping means.

Each clamping and unclamping means is essentially constituted by a set of levers acted upon by springs so as to bear upon the workpiece supported by the aforesaid columns, one of the said levers projecting outwardly from the outer ring to bear upon the underside of a recessed unclamping plate rigidly connected to the said base plate.

According to the preferred form of embodiment, the said unclamping plate is slidingly mounted on uprights provided with springs and rigidly connected to the base plate, the said unclamping plate being adapted to be actuated by a portal-shaped or like member provided with movable fingers.

BRIEF DESCRIPTION OF THE DRAWINGS

But other characterizing features and advantages of the invention will appear more clearly from the following detailed description with reference to the appended drawings given solely by way of example and wherein.

FIG. 3 is an elevational view of the whole of the supporting and clamping device according to the invention, partially broken away and partially in section.

DETAILED DESCRIPTION OF A PREFERRED EMBODIMENT

Referring to the appended drawings, it is seen that the supporting and clamping system according to the invention comprises essentially an assembly 1 for supporting a workpiece 2 of any type and several identical devices for clamping the workpiece 2 such as the one shown at 3 in FIG. 3. As is seen in this Figure, the supporting assembly 1 is arranged on a base plate or pallet 4 so as to allow the assembly 1 to be easily transferred from one workplace to another in order to subject the workpiece 2 to various machining operations.

Figure 1:
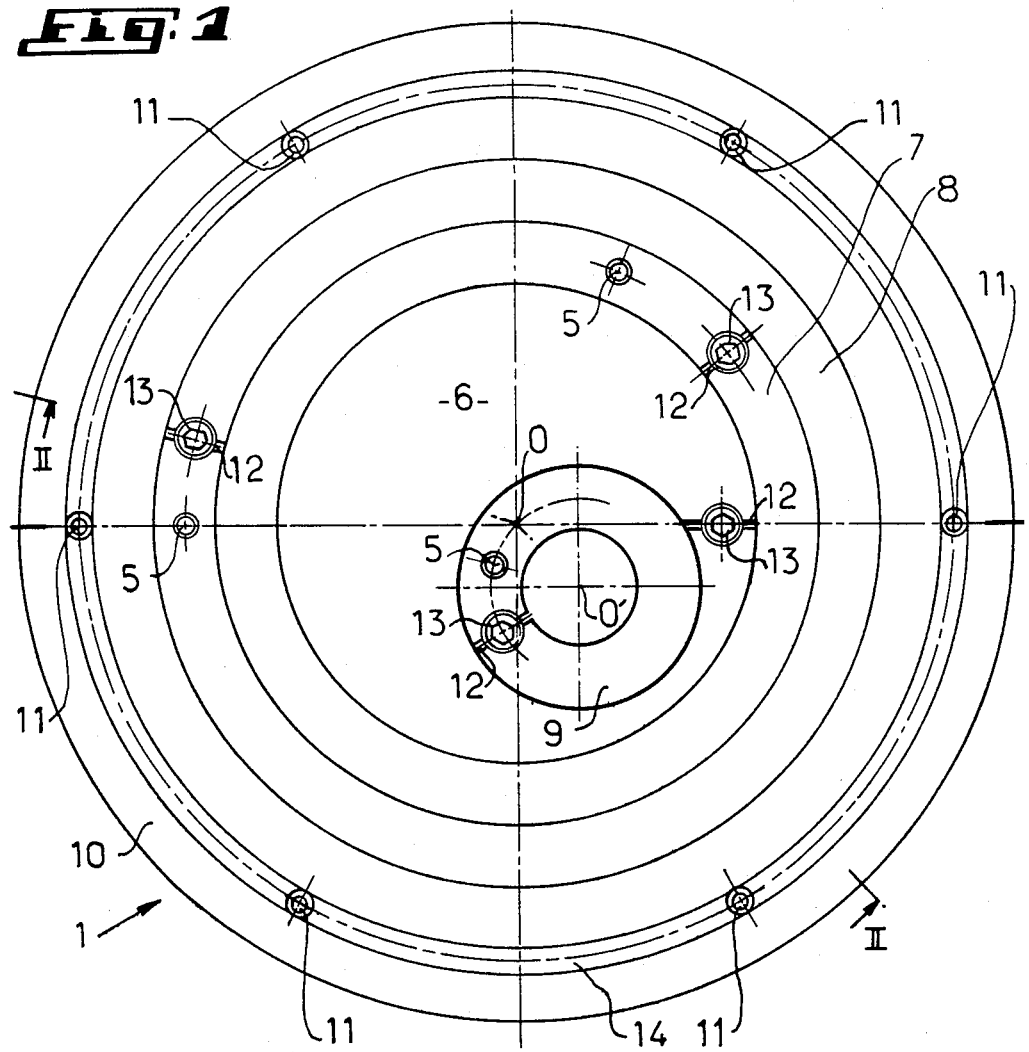
FIG. 1 is a top plan view of the supporting system of discs inserted into one another.
Figure 2:
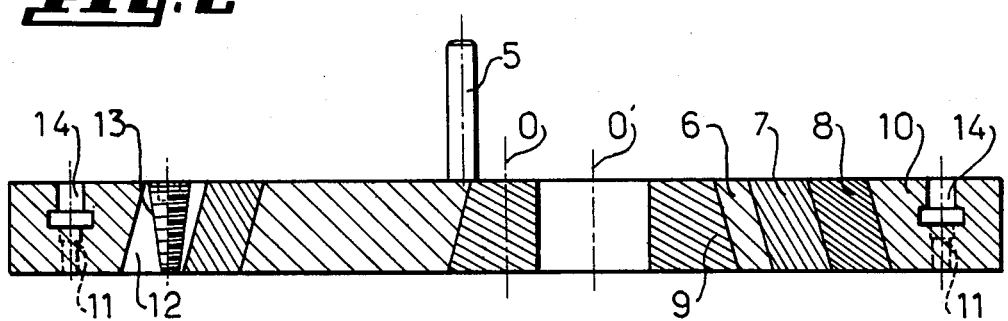
FIG. 2 is a sectional view taken on the line II—II of FIG. 1.

According to the example of embodiment illustrated and as better seen in FIGS. 1 and 2, the supporting assembly 1 is made up of a plurality of rings or discs relatively movable in rotation on the base plate 4 and at least some of which carry a workpiece supporting column 5. As will now be described, the columns 5 are three in number and their relative rotation allows all points of any given surface 2a to be supported to be covered with accuracy.

The supporting assembly 1 is made up essentially of four discs insertable into one another and arranged concentrically in one another with the exception of one of them which is excentric with respect to the others. More specifically, the assembly 1 is constituted by a first disc 6 which carries no column 5, by a second disc 7 which carries a column 5 and by a third disc 8 which also carries a column 5, the three discs 6, 7 and 8 being concentric and freely displaceable about common centre 0. An eccentric disc or ring 9 is inserted into the first disc 6 and can freely rotate therein about the point 0'. The disc 9 which is eccentric with respect to the others carries a column 5 which, by rotation, passes through the centre of rotation 0 of the three concentric discs 6, 7 and 8, as seen clearly in FIG. 1. This is an essential condition for the three columns 5 associated with the discs 7, 8 and 9, respectively, to be capable of supporting any surface, for example a workpiece 2 of any shape.

The discs 6, 7, 8 and 9 are all inserted or fitted into an outer ring 10 externally concentric with the third disc 8. The outer ring 10 may be secured to the base plate 4 by means of screws or the like extending through orifices shown diagrammatically at 11 in FIGS. 1 and 2.

As appears clearly from FIG. 2, the mutually contacting surfaces of the discs 6, 7, 8 and 9 and of the outer ring 10 inserted into one another are conical, thus allowing all these elements to be accurately inserted into one another while at the same time allowing free relative rotation of the discs in the outer ring 10.

Each disc 6, 7, 8 and 9 is provided with a slit 12 into which can be inserted any suitable element allowing for extension of the discs. This means may be for example a conical screw 13.

The supporting assembly 1 is used as follows. By rotating the discs 6, 7, 8 and 9 relatively to one another, the columns 5 are first adapted to suit the dimensions of the surface 2a of the workpiece 2. Thereafter, by acting upon the screws 13, the discs are fixed on the base plate 4, beginning preferably with the disc 8 which is the larger. In other words, the radial extension of the discs as well as their conicity allows them to be applied on the pallet 4 with a high accuracy. Moreover, when it is desired to disassemble the discs 6, 7, 8 and 9 after having detached the outer ring 10 from the plate 4, there will be no jamming of the discs as a result of their conicity.

The outer ring 10 is provided with a circular slot 14 with a T-shaped profile as seen clearly in FIG. 2, which, according to the example of embodiment illustrated, allows the screws to be introduced and screwed through orifices or bores 11 to secure the outer ring 10 on the base plate 4. In the T-shaped slot 14 are fixed the devices 3 for clamping and unclamping the workpiece 2, which will be now described with reference to FIG. 3.

Each device 3 is secured to the outer ring 10 by bolts or the like 15 through the medium of an oblong aperture 16 allowing an appropriate orientation and displacement of the device 3 with respect to the workpiece 2. The device 3 comprises a support 17 substantially in the shape of a right-angle bracket to which are hingedly connected at 18 two arms acting as levers, i.e., a first lever 19 and a second lever 20. The end 21 of the second lever is hingedly connected to the end of a bearing element 22 provided with an oblong aperture 23 in which is freely movable the end of the first lever 19. A spring 24 is provided between the two levers 19 and 20 and another spring 25 is arranged between the support 17 and the first lever 19 as seen in FIG. 3. At 26 is shown the other end of the lever 20 which at that location is provided with a limit stop bearing upon the support 17.

According to the invention, the first lever 19 is right-angled in general shape and one portion 19a thereof projects outwardly from the outer ring 10, thus being adapted to bear upon the underside of an unclamping plate 27. The external dimensions of the plate 27 are equal to those of the pallet 4. The plate 27 is provided with a central opening 28 shown in FIG. 3, to provide a passage for the clamps 3 while at the same time covering the projecting elements 19a carrying at their end a roller 29 or any other like rolling means.

The unclamping plate 27 is slidingly mounted along uprights or the like 30 rigidly connected to the pallet 4 and provided with springs 31 urging the plate 27 upwardly. The downward movement of this plate may be controlled for example by fingers or the like 32 movably mounted along a portal-shaped member shown quite diagrammatically at 33.

The operation of the clamping and unclamping device 3 is readily inferred from the foregoing description. So long as the arm 19a is not acted upon by the unclamping plate 27, the bearing element 22 presses the workpiece 2 on the supporting columns 5 as clearly seen in FIG. 3. In order to unclamp the workpiece, the movable fingers 32 are actuated to push the unclamping plate 27 downward, thus actuating the arm 19a of the lever 19 and causing the lever 19 to rotate leftward about the point 18. This, as is readily understood, causes the bearing element 22 to rise and therefore unclamp the workpiece 2. When the action of the unclamping plate 27 ceases, the bearing element 22 automatically moves onto and bears upon another workpiece under the action of the spring 25. It would of course be possible, without departing from the scope of the invention, to provide levers and springs differing in number and in shape from those illustrated.

There is thus obtained, according to the invention, a universal device for supporting and clamping a workpiece of any type, which offers all the required qualities of simplicity and reliability and is capable of particularly advantageous application in flexible workshops.

Of course the invention is by no means limited to the form of embodiment described and illustrated which has been given by way of example only. Thus, the three movable columns 11 may be of any type and possibly interchangeable and adjustable in height. The same applies to the possible modifications in the embodiment of the clamping system 3 proper, as pointed out previously. Also, the device according to the invention may include more than one disc eccentric with respect to the others and the unclamping plate 27 is actuated by means other than fingers 32.

This means that the invention comprises all technical means equivalent to the means described as well as their combinations should the latter be carried out according to its gist and used within the scope of the protection claimed hereafter.

What is claimed is:

1. A universal device for temporary supporting and clamping of a workpiece of any type, comprising:
   a base plate;
   a plurality of discs inserted into one another and relatively movable in rotation on said base plate, said plurality of discs comprising, from outwardly to inwardly thereof, a first disc, a second disc, and a third disc concentrically arranged with respect to one another to rotate about a common center of rotation, and a fourth disc eccentrically arranged within said third disc;
   a column mounted on each of said respective first, second, and fourth discs, said column mounted on said fourth disc passing through said column center of rotation of said other three discs upon rotation of said fourth disc, so that said three columns carried by said respective first, second and fourth discs are capable of covering all points of any given surface of the workpiece; and
   means for clamping and unclamping the workpiece supported by said columns.

2. A device according to claim 1, wherein said plurality of discs are inserted in an outer ring externally concentric with said first disc and rigidly connected to said base plate.

3. A device according to claim 2, wherein said plurality of discs and said outer ring comprise mutually contacting surfaces which are conical.

4. A device according to claim 1, wherein each of said discs is provided with a radial slit and a conical screw inserted into said radial slit so as to render each said disc extensible and rigidly connectable to said base plate.

5. A device according to claim 2, wherein said outer ring is provided with a substantially circular slot in which said clamping and unclamping means are adjustably secured around the workpiece.

6. A device according to claim 5, wherein said clamping and unclamping means comprise spring-loaded lever means adapted to bear upon the workpiece supported by said columns, said lever means including one lever projecting outwardly from said outer ring, and said base plate comprises an unclamping plate adapted to co-operate with said lever to unclamp the workpiece.

7. A device according to claim 6, wherein said base plate comprises uprights onto which said unclamping plate is slidingly mounted, and said device additionally comprising a portal-shaped member comprising movable fingers to actuate said unclamping plate.

8. A device according to claim 6, wherein said lever is provided with a roller bearing underneath said unclamping plate.

* * * * *